3,044,888
GLASS FIBER
Jason D. Provance, Morgantown, W. Va., assignor to Houze Glass Corporation, Point Marion, Pa., a corporation of Pennsylvania
No Drawing. Filed July 5, 1960, Ser. No. 40,557
7 Claims. (Cl. 106—50)

This invention relates to glass fiber and particularly to glass compositions and fibers having high strength, high modulus of elasticity and high durability at high temperature in the area of 2000° F.

There has been a demand for drawn fiber glass compositions which can be successfully drawn into fibrous form particularly for use as laminates in structural materials where high strength, high modulus of elasticity and high temperature resistance are important. The problems of achieving these characteristics have long been recognized in the glass work art, however, no completely satisfactory composition has been available for forming long staple glass fibers having the desired characteristics. High temperature glass compositions have heretofore been produced but they are subject to the drawbacks of a short working temperature range and to the production of a preponderance of short fibers which are not adaptable to high strength structural components.

The present invention provides a glass which is capable of being drawn continuously into roving or parallel mat form and which is characterized as having high strength, a high modulus of elasticity and high durability at high temperatures. The material of the present invention has a working range in the area of 50° F. which permits the attenuation of the composition into fibrous form. The composition of this material differs from high temperature glasses heretofore proposed in resistance to devitrification so that a high strength long staple clear fibrous material may be produced. The composition of the present invention has the following broad general compositions:

About 30% to 40% aluminum oxide,
About 40% to 50% silica,
About 0.5% to 8% zirconium oxide,
About 3% to 24% magnesium oxide,
Less than about 6.0% sodium oxide,
With usual impurities in ordinary amounts.

While the composition of the glass batch of this invention may fall within the broad range of concentrations of elements enumerated above and still retain its desirable characteristics of high working range, high tensile strength, high modulus of elasticity and high durability and temperature resistance, it is desirable to limit the composition to a narrower range of elements for more economical and effective use of the composition elements. Therefore, a narrower, preferable range of composition limits is as follows:

About 34% to 38% aluminum oxide,
About 45% to 49% silica,
About 2.5% to 6.5% zirconium oxide,
About 8% to 15% magnesium oxide,
Less than about 1.3% sodium oxide,
With usual impurities in ordinary amounts.

A single preferred composition would be as follows:

About 47% $SiO_2$,
About 36% $Al_2O_3$,
About 4% $ZrO_2$,
About 10.5% MgO,
About 0.5% $Na_2O$,
And the balance oxides of impurities including $TiO_2$, $K_2O$, $Fe_2O_3$ in usual amounts.

Other compositions that may be suitable within the purview of the invention are as follows:

About 47.3% $SiO_2$,
About 37.1% $Al_2O_3$,
About 2.7% $ZrO_2$,
About 10.1% MgO,
About .7% $Na_2O$,
About .5% $F_2$,
And the balance oxides of impurities including $TiO_2$, $Fe_2O_3$ and $K_2O$ in usual amounts.
About 46.5% $SiO_2$,
About 34.7% $Al_2O_3$,
About 6.1% $ZrO_2$,
About 10.1% MgO,
About .7% $Na_2O$,
About .4% $F_2$,
And the balanced oxides of impurities including $Fe_2O_3$, $TiO_2$ and $K_2O$ in usual amounts.

As evidenced by the latter examples, flourine may be added up to about .5% of the composition. Such addition of fluorine appears to increase the strength of the glass fiber without detrimental effect, however, the addition of fluorine is not necessary within the purview of the invention.

The oxides of iron, potassium, titanium and sodium generally occur as impurities and in the usual amounts do not seriously affect the composition. Sodium oxides above 6% detrimentally affect the high temperature resistance and strength but in amounts below 6% may be tolerated and contributes to enlarging the working temperature range.

A glass batch having the following chemical compositions:

| | | | |
|---|---|---|---|
| $SiO_2$ | 47.3 | TiO | .1 |
| $Al_2O_3$ | 35.8 | $ZrO_2$ | 4.2 |
| $Fe_2O_3$ | .9 | MgO | 10.5 |
| $Na_2(K_2)O$ | 1.2 | | | was melted by admixing

| | Parts |
|---|---|
| Sand | 47.3 |
| Aluminum hydrate | 55.0 |
| Zircopax | 8 |
| Sodium silicate | 1 |
| Magnesium hydroxide | 18.5 | and melting at between 2600° F. and 3300° F. The molten glass was formed into fibers on a drawing wheel and the fibers were tested with the following results:

Tensile strength _____ $805 \times 10^3$ p.s.i.
Modulus of elasticity _____ $28.0 \times 10^6$ p.s.i.
Minimum fiber softening temperature about 1900° F. to 2200° F.

The fibers resulting from this particular example were continuously drawn in both roving and parallel mat form having long staple glass fibers of the most desirable sort.

Variations in the magnesium oxide content within the percentages aforementioned in the broad general compositions varied the minimum fiber softening temperature from 1600° F. to 2400° F. The low percentage magnesium oxide composition having the higher melting temperatures and vice versa.

Magnesium oxide variation also affects the working range of the composition in that the greater the percentage of magnesium oxide content, the greater the working range of the composition. However, the addition of magnesium oxide in amounts exceeding those broadly indicated may cause the composition to lose its resistance to devitrification.

While I have described a preferred embodiment of my invention, it will be understood that this invention may

I claim:

1. A high tensile long staple glass fiber of improved heat resistance having a minimum fiber softening temperature from about 1600° F. to about 2400° F. consisting essentially of about 30% to 40% aluminum oxide, about 40% to 50% silica, about 0.5% to 8% zirconium oxide, about 3% to 24% magnesium oxide, less than about 6.0% sodium oxide, with usual impurities in ordinary amounts.

2. A high tensile long staple glass fiber of improved heat resistance having a minimum fiber softening temperature from about 1600° F. to about 2400° F. consisting essentially of about 30% to 40% aluminum oxide, about 40% to 50% silica, about 0.5% to 8% zirconium oxide, about 3% to 24% magnesium oxide, less than about 6.0% sodium oxide, about 0.3% to 0.5% fluorine, with usual impurities in ordinary amounts.

3. A high tensile long staple glass fiber of improved heat resistance having a minimum fiber softening temperature from about 1600° F. to about 2400° F. consisting essentially of about 34% to 38% aluminum oxide, about 45% to 49% silica, about 2.5% to 6.5% zirconium oxide, about 8% to 15% magnesium oxide, less than about 1.3% sodium oxide with usual impurities in ordinary amounts.

4. A high tensile long staple glass fiber of improved heat resistance having a minimum fiber softening temperature from about 1600° F. to about 2400° F. consisting essentially of about 34% to 38% aluminum oxide, about 45% to 49% silica, about 2.5% to 6.5% zirconium oxide, about 8% to 15% magnesium oxide, less than about 1.3% sodium oxide, about 0.3% to 0.5% fluorine, with usual impurities in ordinary amounts.

5. A high tensile glass fiber of improved heat resistance having a minimum fiber softening temperature from about 1600° F. to about 2400° F. consisting essentially of about 47% $SiO_2$, about 36% $Al_2O_3$, about 4% $ZrO_2$, about 10.5% $MgO$, about 0.5% $Na_2O$, and the balance oxides of impurities including $TiO_2$, $K_2O$ and $Fe_2O_3$ in usual amounts.

6. A high tensile long staple glass fiber of improved heat resistance having a minimum fiber softening temperature from about 1600° F. to about 2400° F. consisting essentially of about 47.3% $SiO_2$, about 37.1% $Al_2O_3$, about 2.7% $ZrO_2$, about 10.1% $MgO$, about 0.7% $Na_2O$, about 0.5% $F_2$, and the balance oxides of impurities including $TiO_2$, $K_2O$, and $Fe_2O_3$ in usual amounts.

7. A high tensile long staple glass fiber of improved heat resistance having a minimum fiber softening temperature from about 1600° F. to about 2400° F. consisting essentially of about 46.5% $SiO_2$, about 34.7% $Al_2O_3$, about 6.1% $ZrO_2$, about 10.1% $MgO$, about 0.7% $Na_2O$, about 0.4% $F_2$ and the balance oxides of impurities including $TiO_2$, $K_2O$ and $Fe_2O_3$ in usual amounts.

References Cited in the file of this patent

FOREIGN PATENTS 124,553    Australia _____ June 26, 1947